(No Model.)  3 Sheets—Sheet 1.

L. F. JORDAN.
CASH REGISTER AND INDICATOR.

No. 568,257. Patented Sept. 22, 1896.

Witnesses

Inventor
Linwood F. Jordan
by Foster & Freeman
Attorneys (No Model.) 3 Sheets—Sheet 2.

L. F. JORDAN.
CASH REGISTER AND INDICATOR.

No. 568,257. Patented Sept. 22, 1896.

Witnesses
Jno. G. Hinkel
[signature]

Inventor
Linwood F. Jordan
by Foster & Freeman
Attorneys

THE NORRIS PETERS CO., PHOTO-LITHO., WASHINGTON, D. C.

(No Model.)　　　　　　　　　　　　　　　　　3 Sheets—Sheet 3.
L. F. JORDAN.
CASH REGISTER AND INDICATOR.

No. 568,257.　　　　　　　　　　Patented Sept. 22, 1896.

UNITED STATES PATENT OFFICE.

LINWOOD F. JORDAN, OF PORTLAND, MAINE.

CASH REGISTER AND INDICATOR.

SPECIFICATION forming part of Letters Patent No. 568,257, dated September 22, 1896.

Application filed July 10, 1895. Serial No. 555,547. (No model.)

*To all whom it may concern:*

Be it known that I, LINWOOD F. JORDAN, a citizen of the United States, residing at Portland, in the county of Cumberland and State of Maine, have invented certain new and useful Improvements in Cash Registers and Indicators, of which the following is a specification.

This invention relates to certain new and useful improvements in cash-indicators and rotary display devices; and it consists, substantially, in such features of construction, arrangement, and combinations of parts as will hereinafter be more particularly described.

The invention has for its object to indicate to each customer the amount of his or her purchase and to enable an accurate account to be kept of the total cash sales of an establishment, as well as of the individual cash sales of each clerk or salesman.

The invention also has for its object to prevent withdrawal or abstraction of the checks after they have been properly inserted in the places designed for their reception.

A further object of the invention is the automatic release and ejection of the cash-receptacle each time a check is forced into the check-receptacle, as well also as the self-locking of the cash-receptacle when the same is pushed back into place.

A still further object is the provision of rotary display devices which are set in motion or actuated by the movement of the cash-receptable or other means.

The above objects I attain by the means illustrated in the accompanying drawings, wherein—

Figure 1:
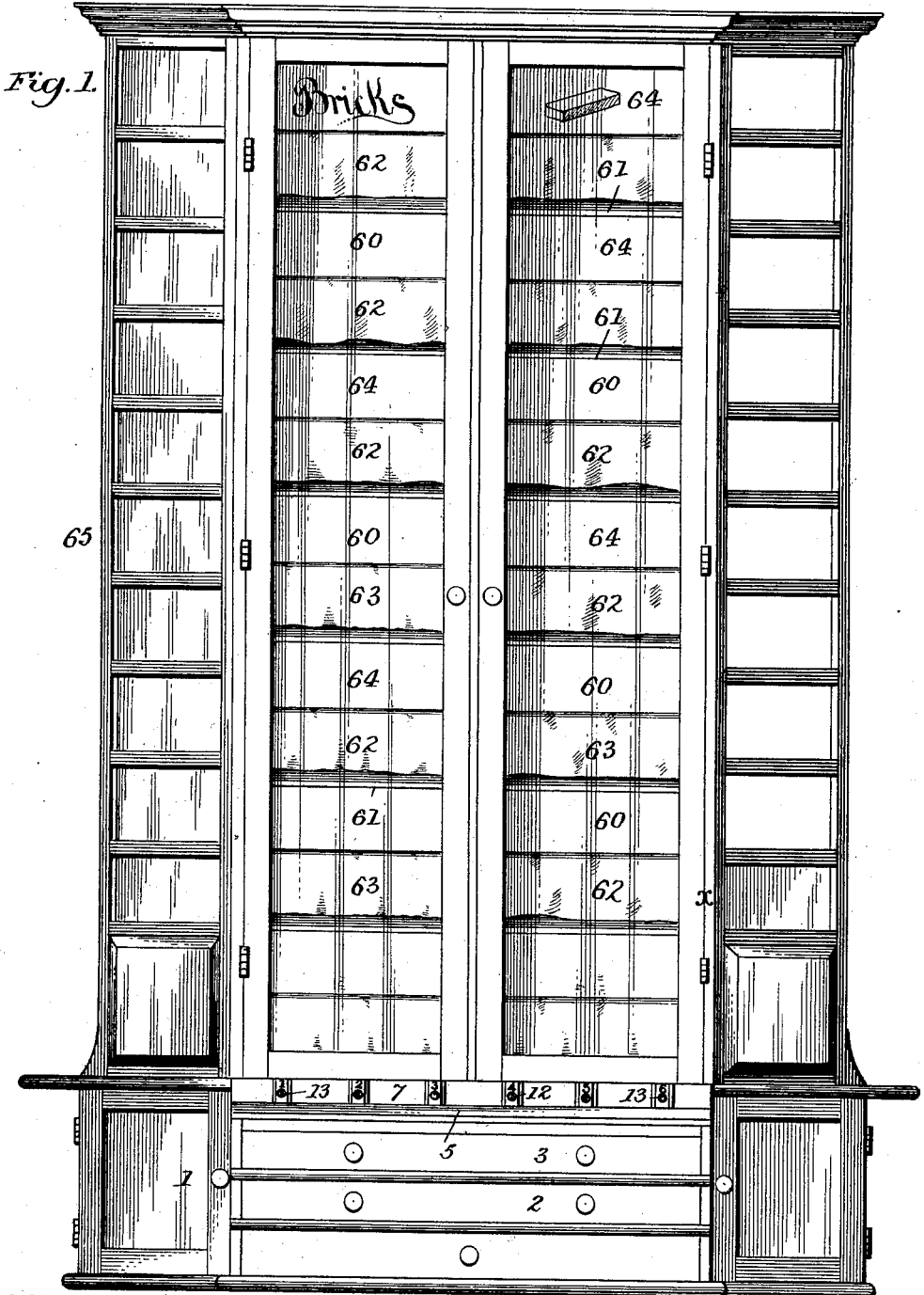
Figure 5:
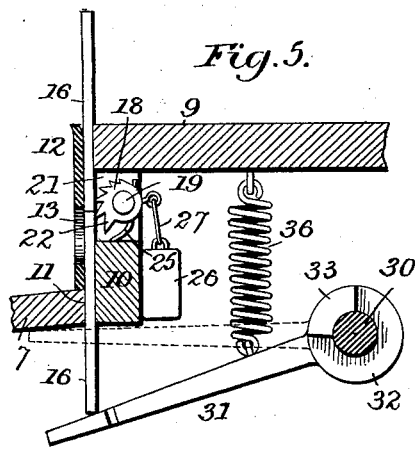
Figure 2:
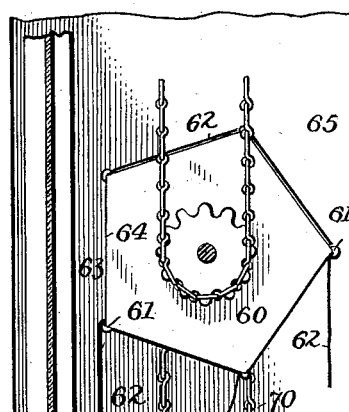
Figure 6:
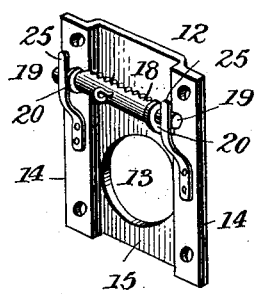
Figure 7:
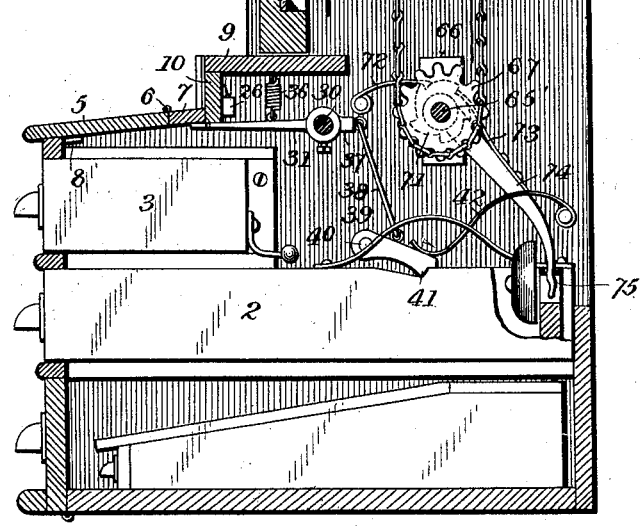
Figure 7:
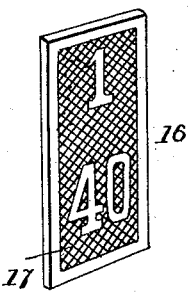
Figure 8:
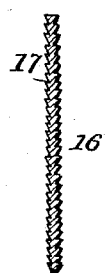
Figure 3:
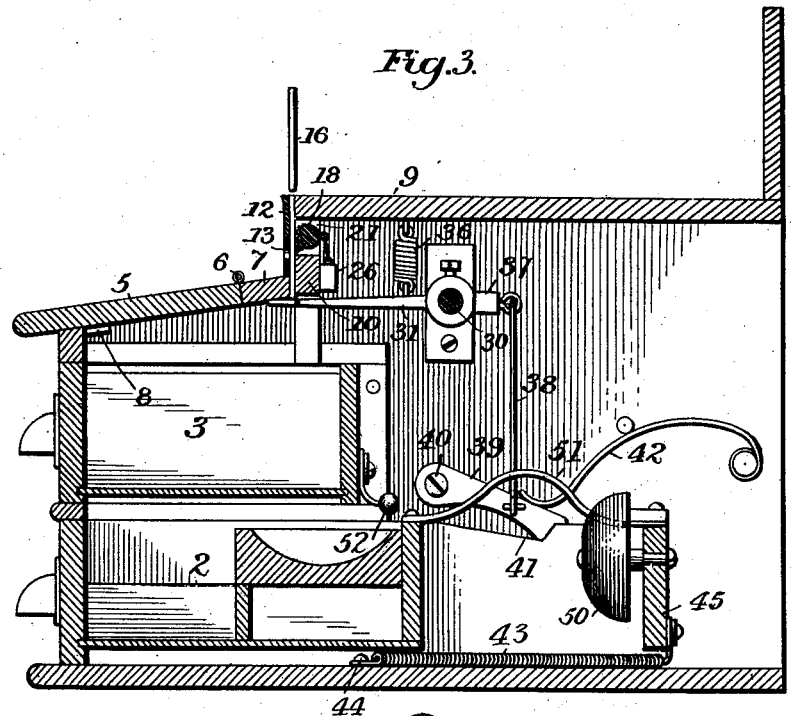
Figure 4:
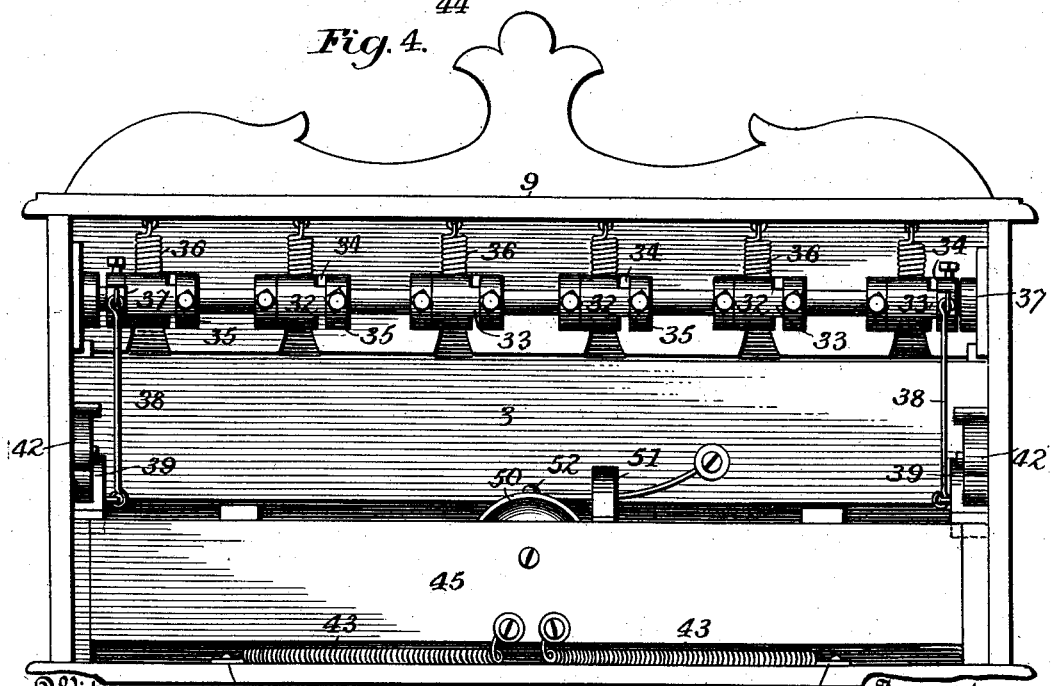

Figure 1 is a front elevation of the cash-indicator and rotary display devices combined. Fig. 2 is a vertical sectional view thereof on the line *x x*, and showing more clearly the construction and arrangement of the display devices, as well as the means by which they are actuated by movement of the cash-receptacle. Fig. 3 is an enlarged transverse sectional view of the indicator, showing the disposition of the interior mechanism. Fig. 4 is a rear view of the indicator with the back of the inclosing case or cabinet removed. Fig. 5 is an enlarged sectional view in detail showing the arrangement of the preferred means employed for preventing withdrawal or abstraction of the checks. Fig. 6 is a rear perspective view of one of the check-supporting frames, and showing one means of supporting the catches which engage the checks. Fig. 7 is a perspective view of one of the checks, and Fig. 8 is an edge view of the check.

In carrying my invention into effect I provide a suitable casing or cabinet 1 for the cash-indicator, and located therein, preferably at the lower part thereof, is a cash receptacle or drawer 2, designed to hold the cash received for purchases. Also located in said cabinet or casing, above the cash-receptacle, is a check-receptacle 3, which is always kept locked and is intended to be accessible only to the proprietor of the establishment or other person in authority. Said check-receptacle may either be constructed as a drawer, movable in and out in the ordinary manner, or it may consist simply of a stationary box closed at the top by a lid 5, hinged at 6 to a strip 7, extending across the front of the cabinet at the top. With either construction a suitable lock 8 is employed to keep said receptacle closed against access. Located above the strip 7 is a top strip 9, and connecting the two strips 7 and 9 is a front piece 10, extending across the front of the cabinet and intersecting said strips 7 and 9.

It may be well to state at this point that the indicator has a number of check-openings and receiving-frames corresponding to the total number of clerks or salesmen employed, and each of said openings and frames is identified by a numeral or other character and set apart for the exclusive use of a particular salesman who is identified by the same numeral or other corresponding character. The check indicating the amount of sales made by any clerk remains visible until that clerk makes another sale, whereupon to insert a new check it becomes necessary to dislodge the first, and the act of doing this actuates the cash receptacle or drawer. The check-receptacle is divided into as many separate compartments as there are check-openings. Various constructions could be resorted to for practicing this part of my invention, but preferably I employ the devices and arrangement thereof such as I have herein illustrated. Thus in the present instance I employ six check-openings 11, formed in the strip 7, and each communicating with the interior of the check-receptacle. Any preferred form of channel may be employed for receiving and holding the check to view, but preferably I employ the construction now to be described. Secured to the front piece 10 in any suitable manner, (preferably by screws, which are fastened on the inside,) and communicating with each of the openings 11, is a check-receiving frame 12, having a circular or other shaped opening 13 to permit the number of the check to be exposed to the view of the customer. These frames 12 could be formed in various ways, but preferably they comprise vertical side flanges 14, for attachment to the support 10, and front pieces 15, which are set out from said flanges at the front sufficiently to leave spaces or channels for the introduction of the checks. I prefer to employ some means for preventing the abstraction or withdrawal of the checks after they have once been inserted in their receiving-frames, and, while various devices could be resorted to for this purpose, I preferably provide the checks of a special construction and locate within or adjacent to each frame or guide a catch which freely admits of the downward movement of the check necessary for its introduction, but which engages said check in any attempt to move the same upward or outward. Thus, as shown in Figs. 7 and 8, the check 16 is of oblong shape, preferably, and both sides of the same are corrugated, roughened, or otherwise indented, and on the front side the indicating-numeral is cut or otherwise inscribed at 17. A preferred form of check comprises transverse parallel ribs by which to be better engaged by the devices hereinafter described, such form being more clearly indicated in the edge view, Fig. 8. Located at each frame, and preferably to the rear thereof, is an eccentric roller 18, having journals 19, which are supported in brackets 20 on the inner side of the flanges 14 of each frame, and which roller and brackets are also partially received in an opening 21, formed in the front piece 10, adjacent to each frame. Each of said rollers is provided longitudinally with several rows or series of downwardly-curved pawls or catches 22, rigid with the roller, and each lowermost series is of gradually-increasing size or length; that is to say, the first or uppermost series of these pawls or catches are comparatively fine and sharp, the next a little coarser, and so on for as many rows or series as may be employed. Said rollers are normally pressed outward by means of springs 25, so that the eccentric portions thereof or those portions on which the catches are arranged will project into the catch-spaces of the said receiving-frames. In lieu of said springs, or preferably in conjunction therewith, I also employ small weights 26, which are attached to the rollers by means of cords 27, passing through the openings 21 in the front strip 10. From this construction it will be seen that the rollers 18 are maintained in position across the interior of the check-frames in such manner that there will be no obstruction offered to the checks as they are inserted in the frames. When a check is inserted in either one of the frames, the lower end thereof will of course come into contact with the roller and rock the latter on its supports sufficient to permit the check to pass. As the tendency of the roller is to bear against the side of the check, it is evident that if an attempt be made to withdraw the check upwardly one or another of the rows or series of catches will engage the corrugations or roughened surface of the check and hold the latter against upward movement. While I have set forth the preferred construction relating to this part of my invention, it is evident that as an equivalent means the checks themselves could be provided with some form of catch engaging on the upward movement thereof with projections or corrugations on the frames, but preferably I employ the devices shown. The principal purpose of said arrangement is to prevent a salesman, after having made a sale, say, amounting to one dollar, from removing the check indicating this amount and substituting therefor a check of some smaller amount, which, if he could succeed in doing, would enable him to appropriate the difference of cash to his own use.

In connection with my improved cash-indicator I employ some means by which to release and open the cash-receptacle whenever a sale is registered, and I prefer to accomplish this through the checks themselves. Any suitable means may be employed both to automatically lock the said receptacle and to release and open the same whenever a check is inserted, but preferably and as a simple contrivance I use a rock-shaft 30, having its bearings in the sides of the casing or cabinet 1, and which is arranged adjacent to and in about the same horizontal plane as the openings through which the checks pass into the check-receptacle. Arranged on this shaft is a series of levers 31, corresponding in number to the check-openings and the free ends of which extend forward and bear against the under side of the top of the cabinet directly beneath said openings. The opposite ends of said levers are provided with hubs 32, fitting the shaft 30 loosely, and each of which hubs has a shoulder 33, adapted, when the forward ends of the levers are depressed, to engage corresponding shoulders 34, provided on collars 35, which are fixed upon the shaft, one alongside of each hub. The forward ends of the levers are normally held in position beneath the check-openings by means of springs 36, and which springs restore the levers to position after they have been depressed by the checks and released.

At or near each end of the rock-shaft 30 and rigid therewith is an arm 37, to which arms are attached the upper ends of pendent rods or strips 38, the lower ends of which are attached or connected to pawls 39, pivoted to the inner sides of the cabinet at 40, with their free ends engaging in notches 41, cut in the upper edges of the sides of the cash drawer or receptacle. These pawls are held into engagement with the notches by means of suitable springs 42, and from the construction shown it is evident that the said receptacle is normally maintained in a locked position. A suitable spring or springs 43, having one end fastened to the bottom of the cabinet at 44 and the other end to a strip 45, carried by the receptacle, exert a constant tendency to throw open the said receptacle, and as soon as the pawls 39 are elevated such is the result. It will be seen that the disposition of the levers 31 is such that when one is operated the others will not be affected; and it will further be seen that after a check has been inserted in either one of the frames it is necessary to push this preceding check into the check-receptacle below by means of another check, and this act of forcing the check through its opening causes the corresponding lever 31 to be depressed, whereupon the shoulder of the hub of the latter engages the shoulder of the adjacent collar, the shaft 30 is rocked, and the pawls which lock the receptacle are elevated. As soon as the check has passed into the receptacle the parts assume their original position, and thus when the cash-drawer is closed it becomes again locked. Supported by the rear cross-strip 45 is a gong 50, and also carried by this strip is a curved spring 51, which, as the cash-drawer moves outward, is carried beneath a clapper 52, supported at the back of the check-receptacle, and the clapper thus actuated strikes against the gong, and thereby signalizes the fact that the cash-drawer has been opened.

My improved rotary display devices, while capable of being operated independently of the cash-indicator, are preferably constructed therewith in the present instance, and are utilized as a means of advertising. Said devices consist generally of a number of cylinders 60, horizontally arranged in position one above the other, and which cylinders, in cross-section, may be either that of a pentagon, a hexagon, or of other suitable configuration, according to the number of sides it is intended shall be made available for advertising-spaces. Said cylinders 60, in order to be as light as possible, are constructed preferably of skeleton framework, and at the angles of the several sides of each suitable guides 61 are secured to receive and hold suitable cards containing advertisements. Also fastened in any suitable manner at such angles and by the longitudinal edges thereof are a number of sheets 62, of silk or other fabric, on which advertising matter is also arranged, and which strips are carried around by the cylinders in such manner that each time the latter are operated these sheets will be caused to drop down, as shown at 63, Fig. 2, before the spaces 64, between the cylinders, and in this way I utilize every bit of available space at the front of the cabinet 65 for advertising purposes.

Various mechanism could be used for intermittently operating the cylinders so as to bring to view different advertising-cards each time the cash-receptacle is operated; but as a convenient means I employ an intermittently-rotating shaft 65', supported in bearings 66 at the sides of the cabinet 65, and on this shaft, at or near one end, is a sprocket-wheel 67, which, by means of a chain 68, is connected to another sprocket 69, carried by the corresponding journal of the lowermost cylinder 60. The opposite end of this cylinder is connected in like manner with the cylinder above it, and so on alternately at opposite ends the said cylinders are similarly connected in pairs at 70, so that said cylinders will all be operated simultaneously and in the same direction each time the cash-receptacle is closed. It is evident that by but slight alteration in the arrangement the said cylinders could be made to so operate on the opening of the cash drawer or receptacle instead, and also that in lieu of a number of cylinders horizontally disposed I could employ simply a single cylinder or drum of polygonal cross-section and operated by substantially the same means. The said rock-shaft is also provided at or near each end with ratchets or toothed wheels 71, rigid on the shaft, and the teeth of which are successively engaged by springs 72, which prevent any retrograde or back movement of either said wheels or their shaft. Also engaging successively with the teeth of said wheels from beneath are suitable springs 73, which, while being capable of being arranged in different ways, are preferably attached to arms 74, supported loosely on the said shaft 65'. Normally said arms extend downwardly and outwardly from the shaft at a suitable angle and in the direction of the rear of the cash-receptacle, and their lower ends are in movable connection with said receptacle either by sockets 75, secured to the back of the receptacle, or by other suitable means. It will thus be seen that the ratchets 71, the arms 74, and the springs 73 constitute clutches which are brought into engagement only when the cash-receptacle is forced inward, and when said receptacle is so moved the springs 73 turn the ratchets 71 the distance of one tooth, and of course the shaft 65' is moved correspondingly. This operation imparts motion to the lowermost cylinder 60, as will be understood from the above description, and thus are my improved cash-indicator and rotary display devices adapted for conjoint operation. As hereinbefore stated, I might use the display devices independently of the indicator, and vice versa, in which event, as a means for operating said display devices, I might use any suitable electrical or clockwork mechanism so set or arranged as to move the cylinders intermittently or at stated intervals.

It is evident that various other immaterial changes could be resorted to in the practice of my invention and still be within the scope thereof; and therefore, without limiting myself to the precise details of construction and arrangement of parts shown,

I claim—

1. In a cash-indicator, the combination of a cash-receptacle and a check-receptacle, each normally closed and locked, means for supporting a check in an exposed position, means for releasing the cash-receptacle on the displacement of said check by another check, and means for bodily engaging the checks against withdrawal substantially as shown and for the purpose described.

2. In a cash-indicator, the combination of a check-receptacle having a check-supporting guide and a check-slot, an eccentric roller, and means for normally projecting said roller into the guide, and permitting the yielding of the roller on the insertion of a check, substantially as shown and for the purpose described.

3. In a cash-indicator, the combination of a check-receptacle having an opening for the passage of a check, a channel receiving the check, and a movable cam-roller having series of pawls or catches which engage the check when the latter is started to be withdrawn, substantially as described.

4. In a cash-indicator, the combination of a check-receptacle having an opening for the passage of a check, a frame located above said opening and provided with the brackets, the eccentric roller supported by the brackets and having the catches adapted to engage the check on withdrawal of the same from the frame, and springs normally pressing said roller into the frame, substantially as described.

5. In a cash-indicator, the combination of a check-receptacle having an opening for the passage of a check, a frame located above said opening, an eccentric roller having the catches, springs normally pressing said roller into the frame, and a roughened or corrugated check adapted to be engaged by the catches, substantially in the manner shown and described.

6. In a cash-indicator, the combination of a cash-receptacle, and a check-receptacle having an opening for the passage of a check, a rock-shaft having a rigid collar provided with a shoulder, a lever on said shaft extending beneath the check-opening and having also a shoulder engaging that of the collar, spring-pressed pawls normally maintaining the cash-receptacle locked, and connections between said pawls and shaft, the whole arranged to be operated by the introduction of a check, substantially as described.

7. In a combined cash-indicator and rotary display device, the combination of a cash-receptacle and a check-receptacle, each normally locked, means for opening the cash-receptacle by forcing a check into the check-receptacle, an intermittently-rotating shaft, connections between said shaft and cash-receptacle which operate the former when the latter is forced inward, a series of advertising-rollers, and driving connections between the rollers and from the shaft, substantially as shown and for the purpose described.

8. In a combined cash-indicator and rotary display device, the combination of a cash-receptacle and a check-receptacle, each normally closed and locked, means for releasing the cash-receptacle on the forcing of a check into the check-receptacle, an intermittently-rotating shaft having at or near one end a sprocket-wheel, ratchets or toothed wheels rigid with the shaft, arms loose on the shaft and extending rearward at an angle and movably engaging the rear of the cash-receptacle, springs carried by said arms and moving over the ratchets on the outward movement of said receptacle but engaging said ratchets on the closing of the receptacle, and a series of movable display devices, all substantially as described.

9. In a cash-indicator, the combination with the cash-receptacle of the gong secured to a strip arranged with and at the back of the drawer, a curved or bent spring also supported by said strip and extending forwardly of the drawer, and the clapper actuated by said curved spring, substantially as described.

10. A check for cash-indicators of hard material and having the surfaces thereof roughened or indented in parallel lines, substantially as described.

11. A check for cash-indicators, the same comprising on its sides transverse parallel ribs adapted to be engaged by devices in the receiving-frames therefor, substantially as described.

12. In a cash-indicator, the combination of a cash-receptacle and a check-receptacle, each normally closed and locked, means for exerting a continual pressure to open the cash-receptacle, means for supporting a check in an exposed position, a detent for holding the cash-receptacle closed, means for shifting said detent on the displacement of said check by another check, and means for bodily engaging the checks against withdrawal substantially as shown and for the purpose described.

In testimony whereof I have signed my name to this specification in the presence of two subscribing witnesses.

LINWOOD F. JORDAN.

Witnesses:
E. EVERETT ELLIS,
JOHN G. HINKEL.